US012796658B2

(12) United States Patent
Kimble

(10) Patent No.: US 12,796,658 B2
(45) Date of Patent: Nov. 17, 2026

(54) PET INTERACTION PROTECTIVE DEVICE

(71) Applicant: Darryl Kimble, Hawthorne, CA (US)

(72) Inventor: Darryl Kimble, Hawthorne, CA (US)

( * ) Notice: Subject to any disclaimer, the term of this patent is extended or adjusted under 35 U.S.C. 154(b) by 75 days.

(21) Appl. No.: 18/917,592

(22) Filed: Oct. 16, 2024

(65) Prior Publication Data

US 2026/0101872 A1 Apr. 16, 2026

(51) Int. Cl.

*A01K 13/00* (2006.01)
*A01K 27/00* (2006.01)
*A41D 19/015* (2006.01)

(52) U.S. Cl.

CPC .......... *A01K 13/007* (2013.01); *A01K 27/002* (2013.01); *A41D 19/01505* (2013.01)

(58) Field of Classification Search

CPC .. A01K 13/007; A01K 13/001; A01K 13/006; A01K 27/002; A01K 29/00; A41D 19/01505; A41D 1/06; A41D 3/02; A41D 3/0007; A41D 7/02; A41D 17/00; A41D 2600/106

USPC ................. 119/850, 855, 856; 54/79.1–79.4; D30/144, 145

See application file for complete search history.

(56) References Cited

U.S. PATENT DOCUMENTS 1,562,318 A * 11/1925 Erlandson ............ A01K 13/003 119/673
2,243,831 A * 6/1941 Berner .................... E02F 3/658 37/427
3,742,679 A * 7/1973 Jordan ................. A01K 13/006 54/79.1
5,247,905 A * 9/1993 Arakawa .............. A01K 27/002 119/863
5,676,095 A * 10/1997 Ralls .................... A01K 13/007 D30/145
6,564,753 B1 * 5/2003 Heileg ................. A01K 13/007 119/817
6,786,029 B2 9/2004 Kuzuu
7,637,087 B1 * 12/2009 Graham ............... A01K 13/008 54/79.2
D615,252 S * 5/2010 Nunes-Freitas .............. D30/145
8,677,944 B2 * 3/2014 Kissel, Jr. ............ A01K 13/007 119/850
8,707,910 B1 * 4/2014 Koll ..................... A01K 13/006 119/850
8,851,020 B2 * 10/2014 Pesale .................... A01K 23/00 119/869
9,936,677 B1 * 4/2018 Slater ................... A01K 13/007

(Continued)

FOREIGN PATENT DOCUMENTS

CA 2291298 11/1999

*Primary Examiner* — Richard T Price, Jr.

(57) ABSTRACT

A pet interaction protective device for mitigating injury to a user interacting with a pet includes a garment, which comprises a chest section and a pair of leggings. The chest section has an upper end that is open, a lower end that is closed, and first and second sides. Each legging has a top end that is open and a bottom end that is closed. The top end is attached to the chest section proximate to the lower end of the chest section so that the legging is in fluidic communication with the chest section. Front legs of the pet can be inserted into the leggings so that the chest section overlays a portion of a chest of the pet. The leggings prevent scratching of a user by nails of front paws of the pet. First and second fasteners secure the garment to the pet.

18 Claims, 6 Drawing Sheets

(56) References Cited

U.S. PATENT DOCUMENTS

| | | | | |
|---|---|---|---|---|
| 10,015,950 | B1 * | 7/2018 | White | A01K 27/002 |
| 10,172,767 | B2 | 1/2019 | Hyslop | |
| D901,787 | S * | 11/2020 | Barbour | D30/145 |
| D995,000 | S | 8/2023 | Balson | |
| D1,042,991 | S * | 9/2024 | Michaelson | D30/158 |
| 12,150,429 | B2 * | 11/2024 | Michaelson | A01K 13/001 |
| 2007/0193532 | A1 * | 8/2007 | Shelton | A01K 1/0263 119/850 |
| 2008/0223311 | A1 * | 9/2008 | Ito | A01K 27/002 119/792 |
| 2009/0038663 | A1 | 2/2009 | Juslin | |
| 2010/0043724 | A1 * | 2/2010 | Sherer | A01K 13/006 54/79.2 |
| 2012/0227679 | A1 * | 9/2012 | Bishop | A01K 13/006 119/850 |
| 2013/0008393 | A1 * | 1/2013 | Backman | A61D 9/00 119/850 |
| 2014/0174379 | A1 * | 6/2014 | Kissel, Jr. | A01K 27/002 119/850 |
| 2016/0044895 | A1 * | 2/2016 | Schnieder | A01K 13/007 119/850 |
| 2017/0118956 | A1 * | 5/2017 | Evanko | A01K 13/008 |
| 2017/0280794 | A1 | 10/2017 | Parrish | |
| 2018/0263858 | A1 | 9/2018 | Williams | |
| 2020/0390061 | A1 | 12/2020 | Anastakis | |
| 2022/0095584 | A1 | 3/2022 | Warren | |

* cited by examiner

PET INTERACTION PROTECTIVE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to protective devices and more particularly pertains to a new protective device for mitigating injury to a user interacting with a pet. Interacting with pets, such as dogs and cats, can lead to bite and scratch injuries, particularly from front claws of the pet and when interacting with a puppy that is teething. A device or system to mitigate such injuries would be of benefit to users.

(2) Description of Related Art Including Information Disclosed Under 37 CFR 1.97 and 1.98

The prior art relates to protective devices for mitigating injury to a user interacting with a pet but which are not incorporated into a harness. Prior are protective devices may comprise booty or sock type coverings for paws of a pet. Related prior art includes plastic teething toys, which can provide a target for biting in place of a user's hand, and gloves and mitts that can be worn to protect hands of users.

BRIEF SUMMARY OF THE INVENTION

An embodiment of the disclosure meets the needs presented above by generally comprising a garment, which in turn comprises a chest section and a pair of leggings. The chest section has an upper end that is open, a lower end that is closed, a first side, and a second side. Each legging has a top end that is open and a bottom end that is closed. The top end is attached to the chest section proximate to the lower end of the chest section so that the legging is in fluidic communication with the chest section. The pair of leggings is configured for insertion of front legs of a pet so that the chest section overlays a portion of a chest of the pet. The pair of leggings thus is configured to prevent scratching of a user by nails of front paws of the pet. A first fastener is attached to the first side adjacent to the upper end of the chest section. A second fastener is attached to the second side adjacent to the upper end of the chest section. The second fastener is complementary to the first fastener so that the second fastener is selectively fastenable to the first fastener. The first fastener and the second fastener are configured to be extended over a back and behind a head of the pet, thereby positioning the user to fasten the second fastener to the first fastener to secure the garment to the pet.

Another embodiment of the disclosure includes a pet interaction protective system, which comprises a pet interaction protective device, as per the disclosure above, and a glove. The glove comprises a back and palm section, which defines a hand opening. The sheaths of a set of five sheaths are attached to and extend from the back and palm section opposite the hand opening. Each sheath has an upper face and a lower face. The back and palm section and the set of five sheaths are complementary to a hand of the user so that the glove is configured to be worn on the hand of the user. A plurality of pads is attached to the glove and is configured to resist penetration and thus to mitigate injury from biting of the hand by the pet, particularly a puppy that is teething.

Yet another embodiment of the disclosure includes a method of mitigating injury while interacting with a pet. The method entails provision of a pet interaction protective system, according to the disclosure above. Steps of the method include positioning the pair of leggings over the front legs of the pet such that the chest section overlays a portion of a chest of the pet, extending the first and second fasteners over the back and behind the head of the pet, fastening the second fastener to the first fastener to secure the garment to the pet, inserting one's hand into the glove, and interacting with the pet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
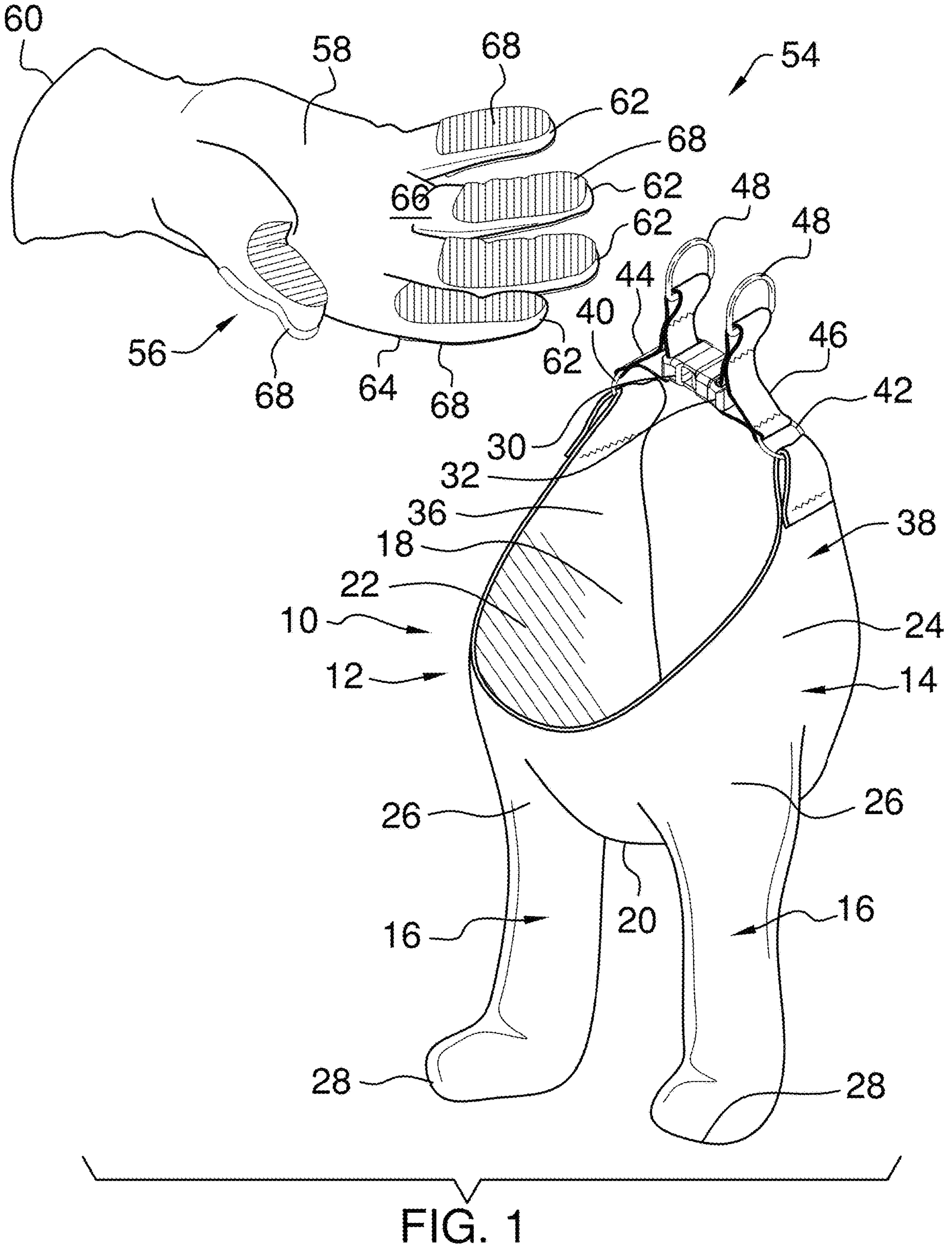
FIG. 1 is an isometric perspective view of a pet interaction protective device according to an embodiment of the disclosure.
Figure 2:
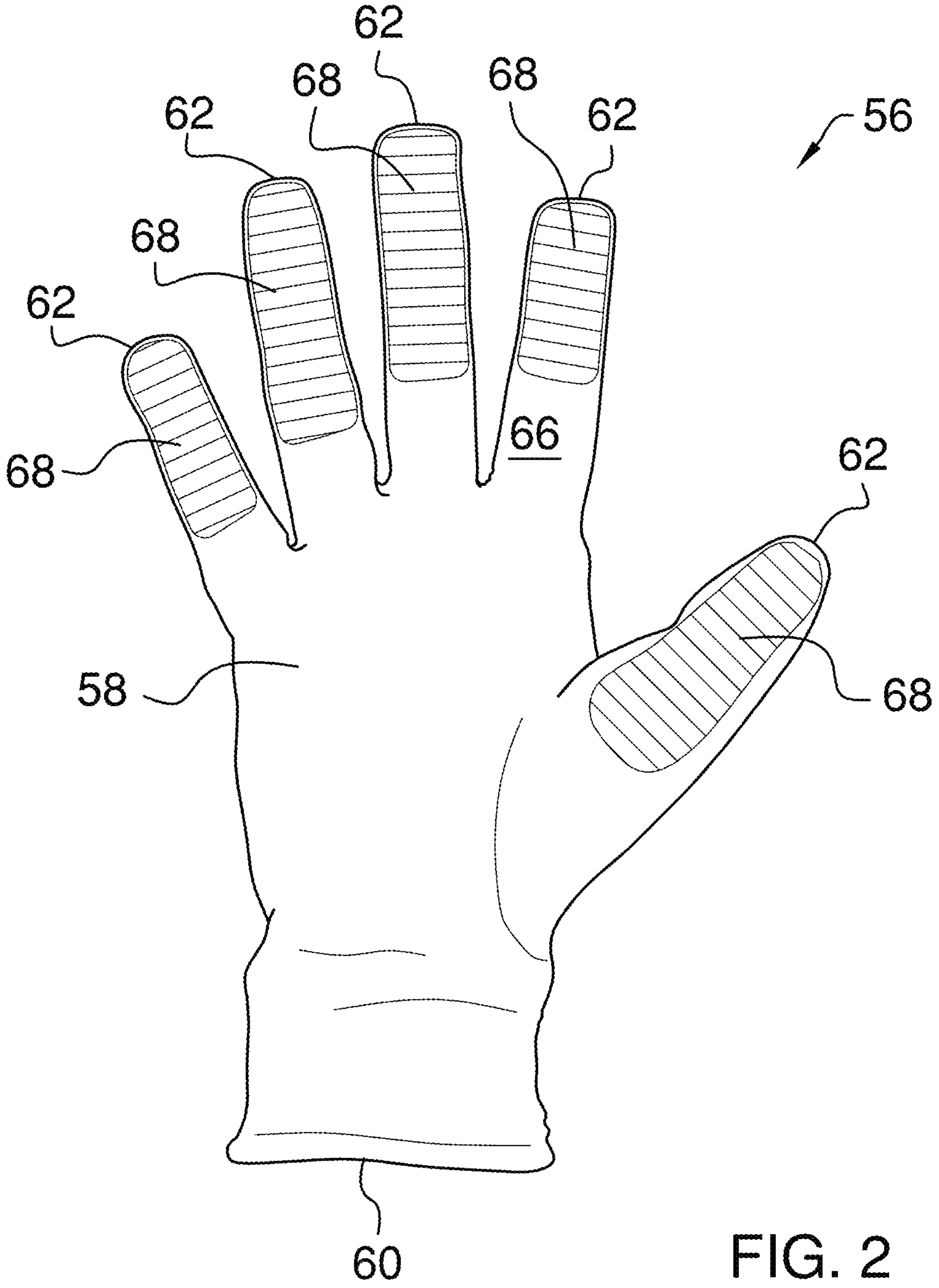
FIG. 2 is a front view of an embodiment of the disclosure.

With reference now to the drawings, and in particular to FIGS. 1 through 6 thereof, a new protective device embodying the principles and concepts of an embodiment of the disclosure and generally designated by the reference numeral 10 will be described.

As best illustrated in FIGS. 1 through 6, the pet interaction protective device 10 generally comprises a garment 12. The garment 12 comprises a chest section 14 and a pair of leggings 16. The chest section 14 has an upper end 18 that is open, a lower end 20 that is closed, a first side 22, and a second side 24. Each legging 16 has a top end 26 that is open and a bottom end 28 that is closed. The top end 26 is attached to the chest section 14, proximate to the lower end 20 of the chest section 14, so that the legging 16 is in fluidic communication with the chest section 14. The pair of leggings 16 is configured for insertion of front legs of a pet so that the chest section 14 overlays a portion of a chest of the pet. The pair of leggings 16 thus is configured to prevent scratching of a user by nails of front paws of the pet. As is shown in the figures, the garment 12 is without openings, save for the upper end 18. The present invention also anticipates a plurality of holes being positioned in the garment 12 to allow for breathing.

A first fastener 30 is attached to the first side 22 adjacent to the upper end 18 of the chest section 14. A second fastener 32 is attached to the second side 24 adjacent to the upper end 18 of the chest section 14. The second fastener 32 is complementary to the first fastener 30 so that the second fastener 32 is selectively fastenable to the first fastener 30. The first fastener 30 and the second fastener 32 are configured to be extended over a back and behind a head of the pet, thereby positioning the user to fasten the second fastener 32 to the first fastener 30 to secure the garment 12 to the pet. The first fastener 30 and the second fastener 32 may comprise a side release buckle 34, as is shown in the figures, other type of buckle, hook and loop fastener, or the like.

As is shown in FIG. 1, the chest section 14 is formed so as to define a first extension 36 and a second extension 38. The first fastener 30 and the second fastener 32 are attached to the first extension 36 and the second extension 38, respectively. The first extension 36 and the second extension 38 facilitate extension of the first fastener 30 and the second fastener 32 over the back and behind the head of the pet.

In one configuration, a first connecting ring 40 is attached to the first extension 36 and a second connecting ring 42 being attached to the second extension 38. The first fastener 30 and the second fastener 32 are attached to the first connecting ring 40 and the second connecting ring 42, respectively, thereby facilitating movement of the first fastener 30 relative to the first extension 36 and movement of the second fastener 32 relative to the second extension 38. It will be apparent to one skilled in the art of harnesses that a wide variety of configurations are suitable for securing the garment 12 to the pet and allowing for attachment to a leash and these configurations are anticipated by the present invention.

Figure 3:
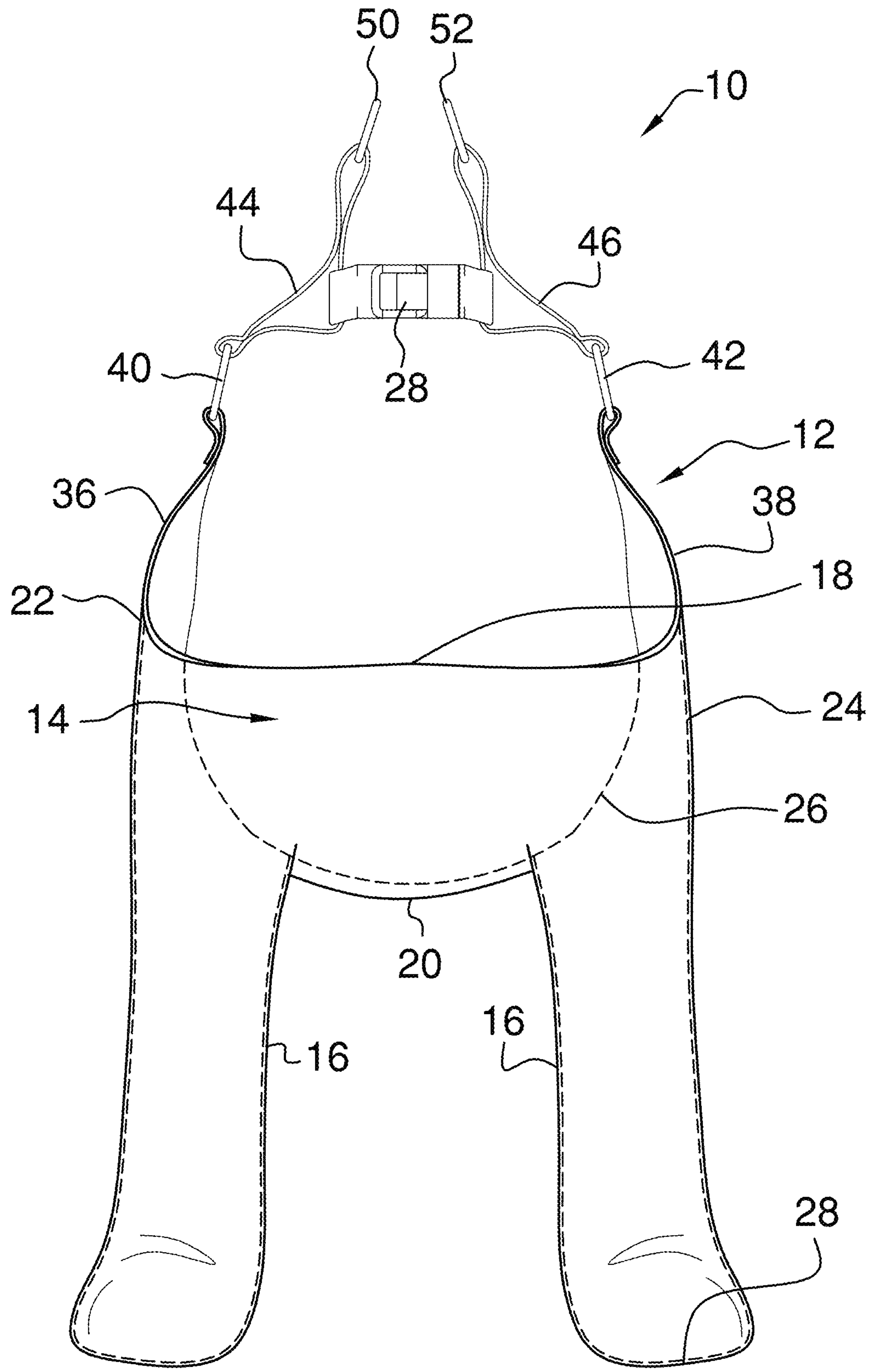
FIG. 3 is a front view of an embodiment of the disclosure.
Figure 4:
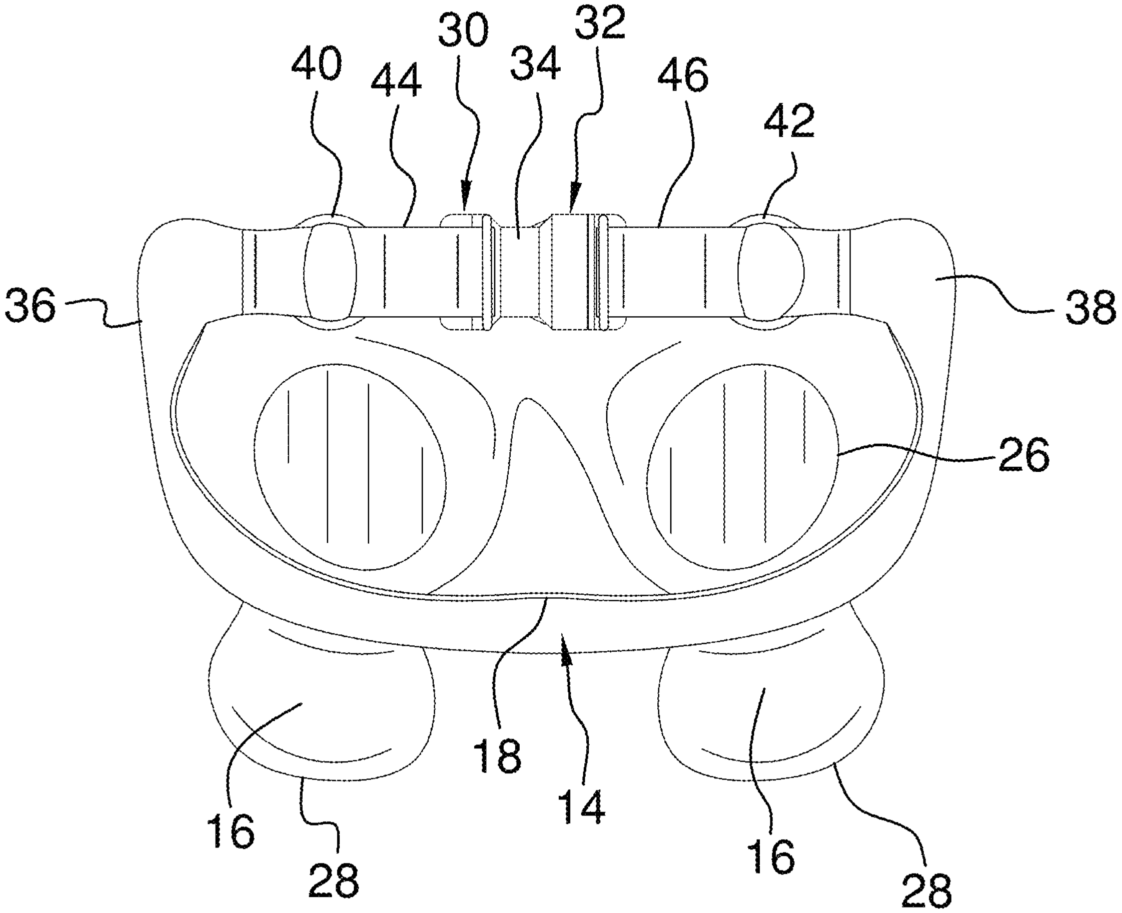
FIG. 4 is a top view of an embodiment of the disclosure.
Figure 5:
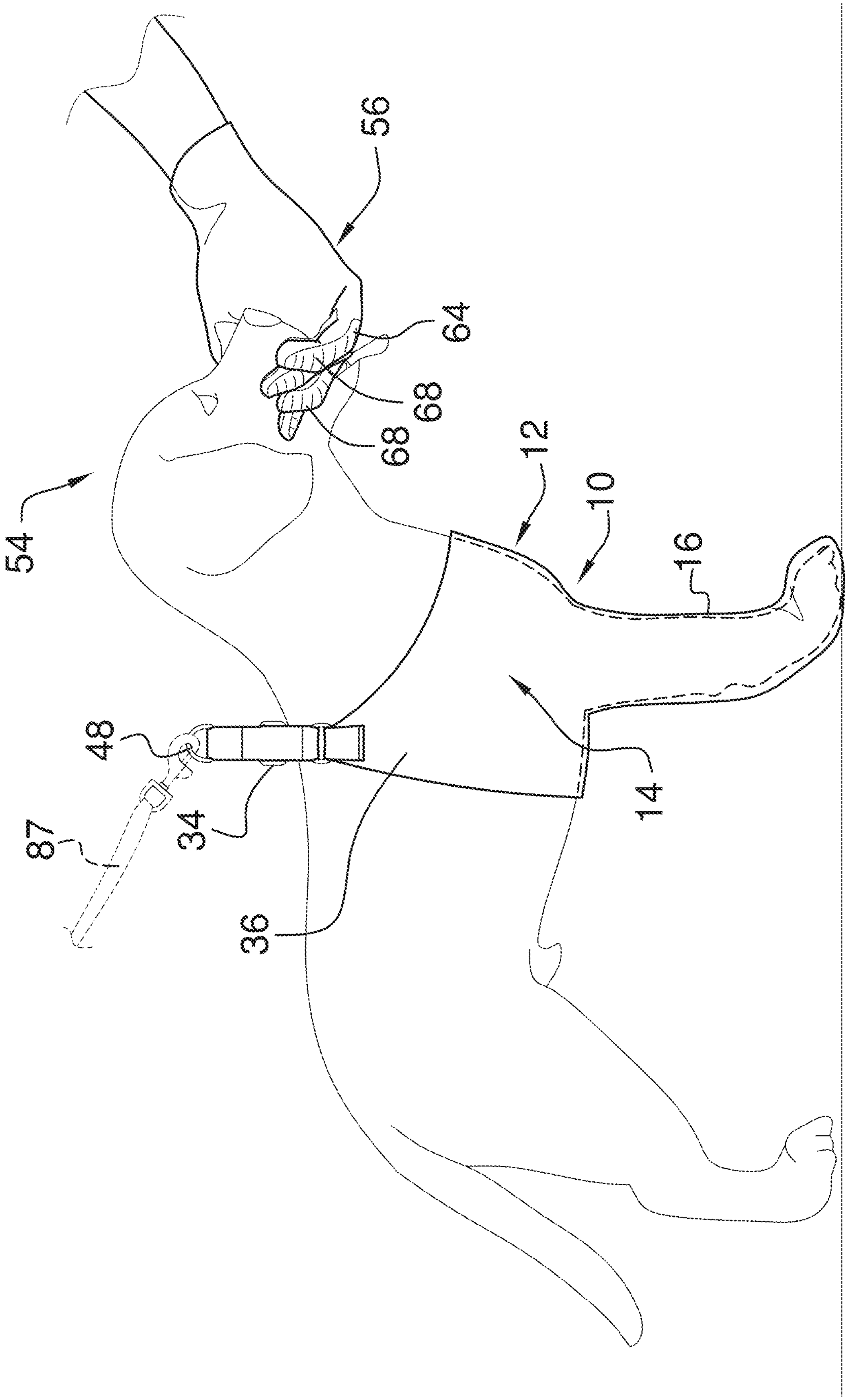
FIG. 5 is an in-use view of an embodiment of the disclosure.
Figure 6:
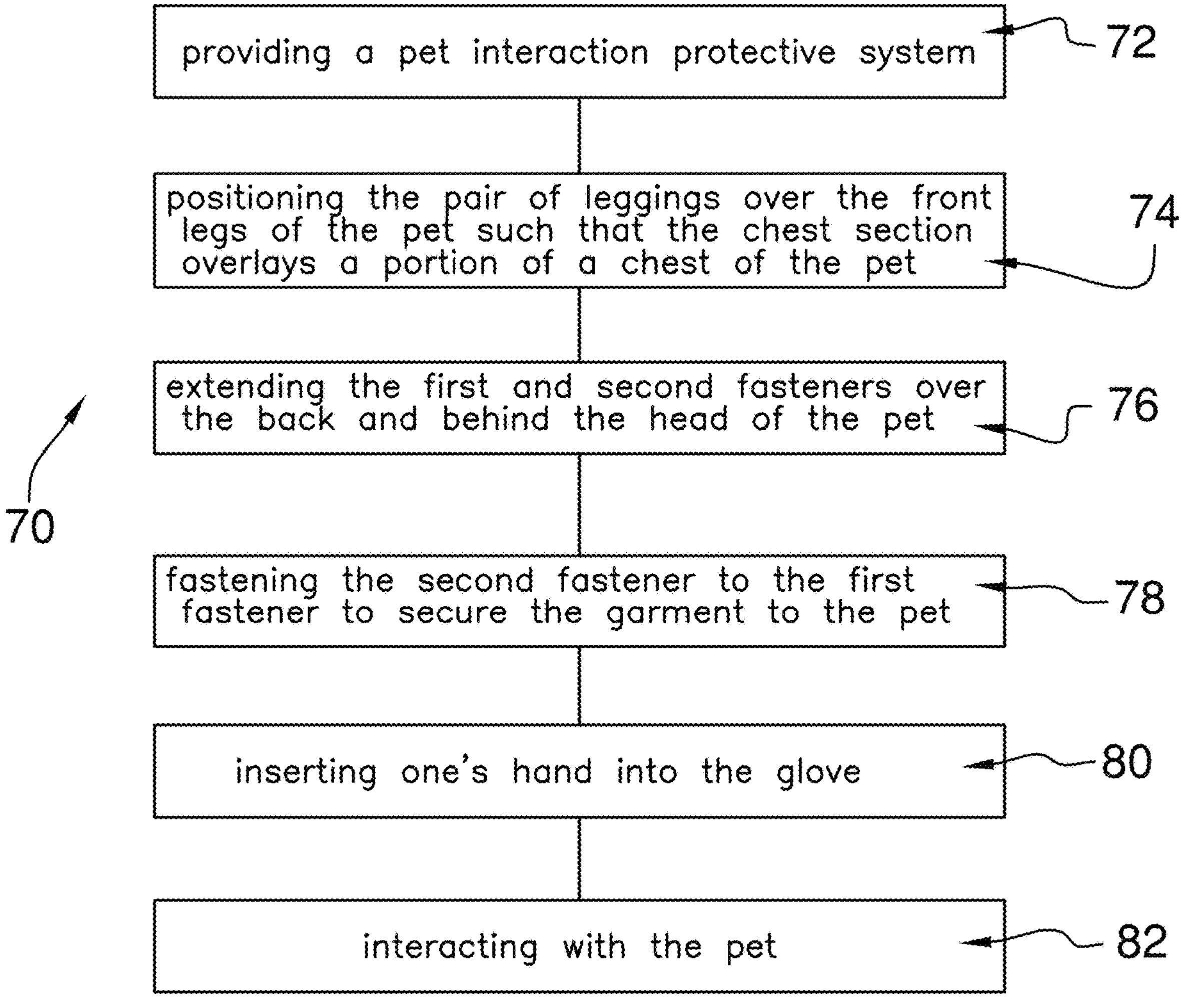
FIG. 6 is a flow chart for a method utilizing an embodiment of the disclosure.

As is shown in FIG. 3, a first loop strap 44 is attached to the first connecting ring 40 and the first fastener 30. A second loop strap 46 is attached to the second connecting ring 42 and the second fastener 32. As will become apparent below, the first loop strap 44 and the second loop strap 46 in combination with a connector 48 that engages a coupler of a leash cause the garment 12 to tighten to the pet when the leash is pulled.

The connector 48 is attached to the chest section 14 and is configured to be complementary to the coupler of the leash. The connector 48 thus is configured to selectively attach the garment 12 to the leash. As is shown in the figures, the connector 48 may comprise a first coupling ring 50, which is attached to the first loop strap 44. The first coupling ring 50 is configured to be complementary to the coupler of the leash and thus is configured to selectively attach the garment 12 to the leash. The connector 48 also may comprise a second coupling ring 52, which is attached to the second loop strap 46 and which would be utilized in the same manner as the first coupling ring 50. It will be apparent to one skilled in the art of harnesses that a wide variety of configurations are suitable for securing the garment 12 to the pet and allowing for attachment to the leash and these configurations are anticipated by the present invention.

The present invention anticipates a pet interaction protective system 54, which comprises a pet interaction protective device 10, as per the specification above, and a glove 56. The glove 56 comprises a back and palm section 58, which defines a hand opening 60. The sheaths 62 of a set of five sheaths 62 are attached to and extend from the back and palm section 58 opposite the hand opening 60. Each sheath 62 has an upper face 64 and a lower face 66. The back and palm section 58 and the set of five sheaths 62 are complementary to a hand of the user so that the glove 56 is configured to be worn on the hand of the user. A plurality of pads 68 is attached to the glove 56 and is configured to resist penetration and thus to mitigate injury from biting of the hand by the pet, particularly a puppy that is teething. The pads 68 are attached to the set of five sheaths 62 so that each upper face 64 and each lower face 66 of each sheath 62 is fitted with a respective pad 68. The pads 68 comprise rubber, silicone, or the like.

In use, the pet interaction protective system 54 enables a method of mitigating injury while interacting with a pet 70. The method 70 comprises a first step 72 of providing a pet interaction protective system 54, according to the specification above. A second step 74 of the method 70 is positioning the pair of leggings 16 over the front legs of the pet so that the chest section 14 overlays a portion of a chest of the pet. A third step 76 of the method 70 is extending the first fastener 30 and the second fastener 32 over the back and behind the head of the pet. A fourth step 78 of the method 70 is fastening the second fastener 32 to the first fastener 30 to secure the garment 12 to the pet. A fifth step 80 of the method 70 is inserting one's hand into the glove 56. A sixth step 82 of the method 70 is interacting with the pet.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pet interaction protective device comprising a garment, the garment comprising:
- a chest section having an upper end, a lower end, a first side, and a second side, the upper end being open, the lower end being closed;
- a pair of leggings, each legging having a top end and a bottom end, the bottom end being integral to said leggings and closed wherein said bottom end is configured for covering nails of front paws of the pet, the top end being open and attached to the chest section proximate to the lower end of the chest section such that the legging is in fluidic communication with the chest section, wherein the pair of leggings is configured for insertion of front legs of a pet such that the chest section overlays a portion of a chest of the pet, wherein the pair of leggings is configured for preventing scratching of a user by the nails of the front paws of the pet;
- a first fastener being attached to the first side adjacent to the upper end of the chest section; and
- a second fastener being attached to the second side adjacent to the upper end of the chest section, the second fastener being complementary to the first fastener such that the second fastener is selectively fastenable to the first fastener, wherein the first fastener and the second fastener are configured for extending over a back and behind a head of the pet thereby positioning the user for fastening the second fastener to the first fastener for securing the garment to the pet.

2. The pet interaction protective device of claim 1, further comprising a connector being attached to the chest section, the connector being configured to be complementary to a coupler of a leash, wherein the connector is configured for selectively attaching the garment to the leash.

3. The pet interaction protective device of claim 1, wherein the first fastener and the second fastener comprise a side release buckle.

4. The pet interaction protective device of claim 1, wherein the chest section is formed so as to define a first extension and a second extension, the first fastener being attached to the first extension, the second fastener being attached to the second extension, such that the first extension and the second extension facilitate extending of the first fastener and the second fastener over the back and behind the head of the pet.

5. The pet interaction protective device of claim 4, further comprising:
- a first connecting ring being attached to the first extension, the first fastener being attached to the first connecting ring, such that movement of the first fastener relative to the first extension is facilitated; and
- a second connecting ring being attached to the second extension, the second fastener being attached to the second connecting ring, such that movement of the second fastener relative to the second extension is facilitated.

6. The pet interaction protective device of claim 5, further comprising:
- a first loop strap being attached to the first connecting ring and the first fastener;
- a second loop strap being attached to the second connecting ring and the second fastener; and
- a first coupling ring being attached to the first loop strap, the first coupling ring being configured to be complementary to a coupler of a leash, wherein the first coupling ring is configured for selectively attaching the garment to the leash.

7. The pet interaction protective device of claim 6, further comprising a second coupling ring being attached to the second loop strap, the second coupling ring being configured to be complementary to the coupler of the leash, wherein the second coupling ring is configured for selectively attaching the garment to the leash.

8. The pet interaction protective device of claim 1, further comprising:
- the first fastener and the second fastener comprise a side release buckle;
- the chest section is formed so as to define a first extension and a second extension, the first fastener being attached to the first extension, the second fastener being attached to the second extension, such that the first extension and the second extension facilitate extending of the first fastener and the second fastener over the back and behind the head of the pet;
- a first connecting ring being attached to the first extension, the first fastener being attached to the first connecting ring, such that movement of the first fastener relative to the first extension is facilitated;
- a second connecting ring being attached to the second extension, the second fastener being attached to the second connecting ring, such that movement of the second fastener relative to the second extension is facilitated,
- a first loop strap being attached to the first connecting ring and the first fastener;
- a second loop strap being attached to the second connecting ring and the second fastener;
- a first coupling ring being attached to the first loop strap, the first coupling ring being configured to be complementary to a coupler of a leash, wherein the first coupling ring is configured for selectively attaching the garment to the leash; and
- a second coupling ring being attached to the second loop strap, the second coupling ring being configured to be complementary to the coupler of the leash, wherein the second coupling ring is configured for selectively attaching the garment to the leash.

9. A pet interaction protective system comprising:
- a garment comprising:
  - a chest section having an upper end, a lower end, a first side, and a second side, the upper end being open, the lower end being closed;
  - a pair of leggings, each legging having a top end and a bottom end, the bottom end being integral to said leggings and closed wherein said bottom end is configured for covering nails of front paws of the pet, the top end being open and attached to the chest section proximate to the lower end of the chest section such that the legging is in fluidic communication with the chest section, wherein the pair of leggings is configured for insertion of the front legs of the pet such that the chest section overlays a portion of a chest of the pet, wherein the pair of leggings is configured for preventing scratching of a user by the nails of the front paws of the pet;
  - a first fastener being attached to the first side adjacent to the upper end of the chest section; and
  - a second fastener being attached to the second side adjacent to the upper end of the chest section, the second fastener being complementary to the first fastener such that the second fastener is selectively fastenable to the first fastener, wherein the first fastener and the second fastener are configured for extending over a back and behind a head of the pet thereby positioning the user for fastening the second fastener to the first fastener for securing the garment to the pet; and a glove comprising:

a back and palm section defining a hand opening;

a set of five sheaths being attached to and extending from the back and palm section opposite the hand opening, the back and palm section and the set of five sheaths being to be complementary to a hand of the user, wherein the glove is configured to be worn on the hand of the user; and a plurality of pads being attached to the glove, the pads of the plurality of pads being configured for resisting penetration, wherein the plurality of pads is configured for mitigating injury from biting of the hand by the pet.

10. The pet interaction protective system of claim 9, wherein each sheath has an upper face and a lower face, the pads of the plurality of pads being attached to the set of five sheaths such that each upper face and each lower face of each sheath is fitted with a respective pad.

11. The pet interaction protective system of claim 9, wherein the pads of the plurality of pads comprise rubber or silicone.

12. The pet interaction protective device of system 9, further comprising a connector being attached to the chest section, the connector being configured to be complementary to a coupler of a leash, wherein the connector is configured for selectively attaching the garment to the leash.

13. The pet interaction protective device of system 9, wherein the first fastener and the second fastener comprise a side release buckle.

14. The pet interaction protective device of system 9, wherein the chest section is formed so as to define a first extension and a second extension, the first fastener being attached to the first extension, the second fastener being attached to the second extension, such that the first extension and the second extension facilitate extending of the first fastener and the second fastener over the back and behind the head of the pet.

15. The pet interaction protective device of system 14, further comprising:

a first connecting ring being attached to the first extension, the first fastener being attached to the first connecting ring, such that movement of the first fastener relative to the first extension is facilitated; and a second connecting ring being attached to the second extension, the second fastener being attached to the second connecting ring, such that movement of the second fastener relative to the second extension is facilitated.

16. The pet interaction protective device of system 15, further comprising:

a first loop strap being attached to the first connecting ring and the first fastener;

a second loop strap being attached to the second connecting ring and the second fastener; and a first coupling ring being attached to the first loop strap, the first coupling ring being configured to be complementary to a coupler of a leash, wherein the first coupling ring is configured for selectively attaching the garment to the leash.

17. The pet interaction protective device of system 16, further comprising a second coupling ring being attached to the second loop strap, the second coupling ring being configured to be complementary to the coupler of the leash, wherein the second coupling ring is configured for selectively attaching the garment to the leash.

18. A method of mitigating injury while interacting with a pet, the method comprising the steps of:

providing a pet interaction protective system comprising:

a garment comprising:

a chest section having an upper end, a lower end, a first side, and a second side, the upper end being open, the lower end being closed;

a pair of leggings, each legging having a top end and a bottom end, the bottom end being integral to said leggings and closed wherein said bottom end is configured for covering nails of front paws of the pet, the top end being open and attached to the chest section proximate to the lower end of the chest section such that the legging is in fluidic communication with the chest section, wherein the pair of leggings is configured for insertion of the front legs of the pet such that the chest section overlays a portion of a chest of the pet, wherein the pair of leggings is configured for preventing scratching of a user by the nails of the front paws of the pet;

a first fastener being attached to the first side adjacent to the upper end of the chest section; and a second fastener being attached to the second side adjacent to the upper end of the chest section, the second fastener being complementary to the first fastener such that the second fastener is selectively fastenable to the first fastener, wherein the first fastener and the second fastener are configured for extending over a back and behind a head of the pet thereby positioning the user for fastening the second fastener to the first fastener for securing the garment to the pet; and a glove comprising:

a back and palm section defining a hand opening;

a set of five sheaths being attached to and extending from the back and palm section opposite the hand opening, the back and palm section and the set of five sheaths being to be complementary to a hand of the user, wherein the glove is configured to be worn on the hand of the user; and a plurality of pads being attached to the glove, the pads of the plurality of pads being configured for resisting penetration, wherein the plurality of pads is configured for mitigating injury from biting of the hand by the pet;

positioning the pair of leggings over the front legs of the pet such that the chest section overlays a portion of a chest of the pet;

extending the first fastener and the second fastener over the back and behind the head of the pet;

fastening the second fastener to the first fastener to secure the garment to the pet;

inserting one's hand into the glove; and interacting with the pet.

* * * * *